United States Patent
Barton

(10) Patent No.: US 12,059,927 B2
(45) Date of Patent: Aug. 13, 2024

(54) WHEEL WITH DEFORMABLE INTERFACING SPOKES

(71) Applicant: Milwaukee Electric Tool Corporation, Brookfield, WI (US)

(72) Inventor: George Barton, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 380 days.

(21) Appl. No.: 17/237,417

(22) Filed: Apr. 22, 2021

(65) Prior Publication Data

US 2021/0331517 A1   Oct. 28, 2021

Related U.S. Application Data

(63) Continuation of application No. PCT/US2021/028158, filed on Apr. 20, 2021.

(60) Provisional application No. 63/082,665, filed on Sep. 24, 2020, provisional application No. 63/014,848, filed on Apr. 24, 2020.

(51) Int. Cl.
  *B60B 9/26*    (2006.01)
(52) U.S. Cl.
  CPC .......... *B60B 9/26* (2013.01); *B60B 2900/313* (2013.01)
(58) Field of Classification Search
  CPC ....... B60B 9/04; B60B 9/26; B60B 2900/313; B60C 7/14; B60C 7/143; B60C 7/146; B60C 7/18
  See application file for complete search history.

(56) References Cited

U.S. PATENT DOCUMENTS

| | | | |
|---|---|---|---|
| 3,219,090 A | | 11/1965 | Cislo |
| 4,553,577 A | * | 11/1985 | Gregg ........................ B60B 9/26 152/80 |
| 8,176,957 B2 | | 5/2012 | Manesh et al. |
| 8,833,864 B2 | | 9/2014 | Solheim et al. |
| 8,944,125 B2 | | 2/2015 | Manesh et al. |
| 9,120,351 B2 | | 9/2015 | Mun et al. |
| 9,248,697 B2 | | 2/2016 | Iwamura |
| 9,387,726 B2 | | 7/2016 | Choi et al. |
| 9,751,270 B2 | | 9/2017 | Thompson |

(Continued)

FOREIGN PATENT DOCUMENTS

| | | |
|---|---|---|
| CN | 1978222 | 6/2007 |
| CN | 103496292 | 1/2014 |

(Continued)

OTHER PUBLICATIONS

International Search Report and Written Opinion for International Application No. PCT/US2021/028158, dated Aug. 10, 2021, 9 pages.

*Primary Examiner* — Kip T Kotter
(74) *Attorney, Agent, or Firm* — Reinhart Boerner Van Deuren s.c.

(57) ABSTRACT

A wheel that deforms to absorb force is provided. The wheel includes one or more deformable spokes that extend from a central portion of the wheel to an outer portion of the wheel. The spokes are configured to interface against neighboring spokes after a spoke is sufficiently deformed. The neighboring spoke provides some support to the deformed spoke, thereby requiring an increased marginal force to further deform the first spoke. In one embodiment the wheel includes a plurality of pairs of spokes that are configured to interface against each other.

17 Claims, 8 Drawing Sheets

(56) References Cited

U.S. PATENT DOCUMENTS

| | | | |
|---|---|---|---|
| 9,981,501 B2 | 5/2018 | Solheim et al. | |
| 10,166,732 B2 | 1/2019 | Thompson | |
| 10,179,476 B2 | 1/2019 | Solheim et al. | |
| 10,252,572 B2 | 4/2019 | Nomura et al. | |
| 10,286,725 B2 | 5/2019 | Celik et al. | |
| 10,350,941 B2 | 7/2019 | Solheim et al. | |
| 10,406,861 B2 | 9/2019 | Iwamura et al. | |
| 2002/0096237 A1 | 7/2002 | Burhoe et al. | |
| 2004/0051373 A1 | 3/2004 | Tolkachev | |
| 2006/0144488 A1* | 7/2006 | Vannan | B60C 7/14 |
| | | | 152/7 |
| 2007/0090683 A1 | 4/2007 | Luo | |
| 2009/0033051 A1 | 2/2009 | Ahnert | |
| 2009/0294000 A1* | 12/2009 | Cron | B60C 7/18 |
| | | | 152/5 |
| 2012/0247635 A1 | 10/2012 | Manesh et al. | |
| 2014/0062168 A1 | 3/2014 | Martin et al. | |
| 2014/0062169 A1 | 3/2014 | Martin et al. | |
| 2014/0062170 A1 | 3/2014 | Martin et al. | |
| 2014/0062171 A1 | 3/2014 | Martin et al. | |
| 2014/0062172 A1 | 3/2014 | Martin et al. | |
| 2015/0283852 A1 | 10/2015 | Chen et al. | |
| 2016/0167434 A1* | 6/2016 | Nishida | B60B 9/26 |
| | | | 152/12 |
| 2017/0015141 A1* | 1/2017 | Shoji | B60C 7/14 |
| 2017/0057289 A1 | 3/2017 | Pratt | |
| 2018/0065414 A1 | 3/2018 | Huang | |
| 2019/0009612 A1 | 1/2019 | Christenbury | |
| 2019/0092090 A1 | 3/2019 | Solheim et al. | |
| 2019/0111645 A1 | 4/2019 | Thompson | |
| 2019/0225012 A1 | 7/2019 | Celik et al. | |
| 2019/0283496 A1 | 9/2019 | Solheim et al. | |
| 2020/0276866 A1* | 9/2020 | Wilson | B60C 7/22 |
| 2020/0324573 A1* | 10/2020 | Tardiff | B60B 9/04 |
| 2021/0039431 A1* | 2/2021 | Long | B60B 9/26 |
| 2021/0394559 A1* | 12/2021 | Abe | B60C 7/18 |

FOREIGN PATENT DOCUMENTS

| | | |
|---|---|---|
| CN | 203438758 | 2/2014 |
| CN | 203449838 | 2/2014 |
| CN | 204472454 | 7/2015 |
| CN | 103129308 | 11/2016 |
| CN | 106142977 A | 11/2016 |
| CN | 206217487 | 6/2017 |
| CN | 206217510 | 6/2017 |
| CN | 206242796 | 6/2017 |
| CN | 107336566 | 11/2017 |
| CN | 107336567 | 11/2017 |
| CN | 106696605 | 9/2018 |
| DE | 202011000463 | 6/2011 |
| KR | 10-2018-0025728 | 3/2018 |
| WO | WO17031530 | 3/2017 |

\* cited by examiner

WHEEL WITH DEFORMABLE INTERFACING SPOKES

CROSS-REFERENCE TO RELATED PATENT APPLICATION

The present application is a continuation of International Patent Application No. PCT/US2021/028158, filed Apr. 20, 2021, which claims the benefit of and priority to U.S. Provisional Application No. 63/014,848, filed on Apr. 24, 2020, and U.S. Provisional Application No. 63/082,665, filed Sep. 24, 2020, which are incorporated herein by reference in their entireties.

BACKGROUND OF THE INVENTION

The present disclosure is directed generally to the field of transportation, and particularly to deformable wheels that are designed to absorb forces that are very large and/or for extended periods of time. These wheels may be used, for example, in a device or tool storage container, such as in a modular tool storage system.

SUMMARY OF THE INVENTION

One embodiment of the invention relates to a deformable wheel including a rotational axis the wheel rotates around, a hub that rotates around the rotational axis, a rim that rotates around the rotational axis, a plurality of first spokes extending between the hub and the rim, and a plurality of second spokes extending between the hub and the rim. The rim is located further from the rotational axis than the hub. During loading of the wheel sufficient to cause deformation of the wheel, one of the first spokes engages against one of the second spokes when the wheel is deformed a first amount such that the engagement resists further deformation of the wheel.

Another embodiment of the invention relates to a wheel including a rotational axis the wheel rotates around, a hub that rotates around the rotational axis, a rim that rotates around the rotational axis, a first spoke extending between the hub and the rim, and a second spoke extending between the hub and the rim. The rim is located further from the rotational axis than the hub. The first spoke includes an inner section extending from the hub, an outer section extending from the rim, and a middle section extending between the inner section and the outer section. The second spoke includes an inner section extending from the hub, an outer section extending from the rim, and a middle section extending between the inner section and the outer section. The middle section of the first spoke and the middle section of the second spoke are convex with respect to each other when the wheel is not deformed.

Another embodiment of the invention relates to a wheel including a rotational axis the wheel rotates around, a hub that rotates around the rotational axis, a rim that rotates around the rotational axis, a first spoke extending between the hub and the rim, and a second spoke between the hub and the rim. The rim is located further from the rotational axis than the hub. The first spoke includes an inner section extending from the hub, an outer section extending from the rim, and a middle section extending between the inner section and the outer section. The second spoke includes an inner section extending from the hub, an outer section extending from the rim, and a middle section extending between the inner section and the outer section. The smallest distance between the first spoke and the second spoke as measured in radians with respect to the rotational axis is between the middle section of the first spoke and the middle section of the second spoke when the wheel is not deformed.

One embodiment of the invention relates to a wheel including a rotational axis the wheel rotates around, a central portion that rotates around the rotational axis, an outer portion that rotates around the rotational axis, and a plurality of spokes that extend between the central portion and the outer portion. The plurality of spokes are coupled at an inner end to the central portion and at an opposing outer end to the outer portion. When a first amount of force is applied to the wheel the plurality of spokes deform and when the first amount of force is removed the plurality of spokes return to their original shape.

In a specific embodiment, the plurality of spokes include a first spoke and a second spoke adjacent to the first spoke. The first spoke deforms towards the second spoke bringing the first spoke into contact with the second spoke when the wheel is subject to the first amount of force, and while the first spoke interfaces against the second spoke, the first spoke continues to deform when the wheel is subject to a second amount of force that is greater than the first amount of force. When the force is removed the plurality of spokes return to their original shape.

In a specific embodiment, the plurality of spokes each include an inner portion proximate the inner end, an outer portion proximate the outer end, and a middle portion between the inner portion and the outer portion. The inner portion defines an arc with a center on a first side of the respective spoke, the outer portion defines an arc with a center on the first side of the respective spoke, and the middle portion defines an arc with a center on a second side of the respective spoke that is opposite the first side.

In a specific embodiment, the plurality of spokes include a plurality of sets of spokes, such as pairs of spokes, that are curved towards each other.

In a specific embodiment, the plurality of spokes comprise a plurality of sets of spokes that include a first spoke and a second spoke. When the wheel is not deformed the first and second spoke collectively define an inner arcuate distance between the inner ends of the first and second spokes, a middle arcuate distance that is the shortest arcuate distance (measured in degrees relative to the rotational axis of the wheel) between the first and second spokes, and an outer arcuate distance between the outer ends of the first and second spokes. The middle arcuate distance is different than both the inner arcuate distance and the outer arcuate distance.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, various embodiments of a wheel are shown, such as may be used with a mobile modular storage system, a mobile tool storage system, a mobile worksite device or machine (e.g., a generator, a compressor, etc.), a hand truck or dolly, etc. In some prior wheel designs when the wheel was deformed for a long period of time under a large amount of weight (e.g., hundreds of pounds), the wheel may remain at least partially deformed even after the weight is removed.

Various embodiments of the wheel described herein utilize elastically deformable spokes that extend from a central portion of the wheel to an outer portion of the wheel. The deformable spokes absorb at least some of the force when the wheel is rolled across uneven surfaces (e.g., over rocks, curbs, etc.) and/or when the wheel is subject to a large amount of weight (e.g., hundreds of pounds). In one embodiment, as a first spoke deforms the first spoke bends towards a neighboring second spoke. When the first spoke is sufficiently deformed to interface with the second spoke, the second spoke physically supports the first spoke thereby requiring an increased amount of force to continue to deform the first spoke even further. Thus, the wheel has a first spring constant for deforming when the first amount of force applied and has a greater spring constant for deforming after the first spoke has been deformed to interface against the second spoke. In this way, the wheel has a progressive and increasing stiffness that is dependent on the amount of weight born by the center hub. Further, because the deformation under both sets of loading are within the elastic range of the spoke design, the wheel returns to unloaded shape (e.g., with the wheel defining a generally circular outer perimeter once the load is removed).

Figure 1:
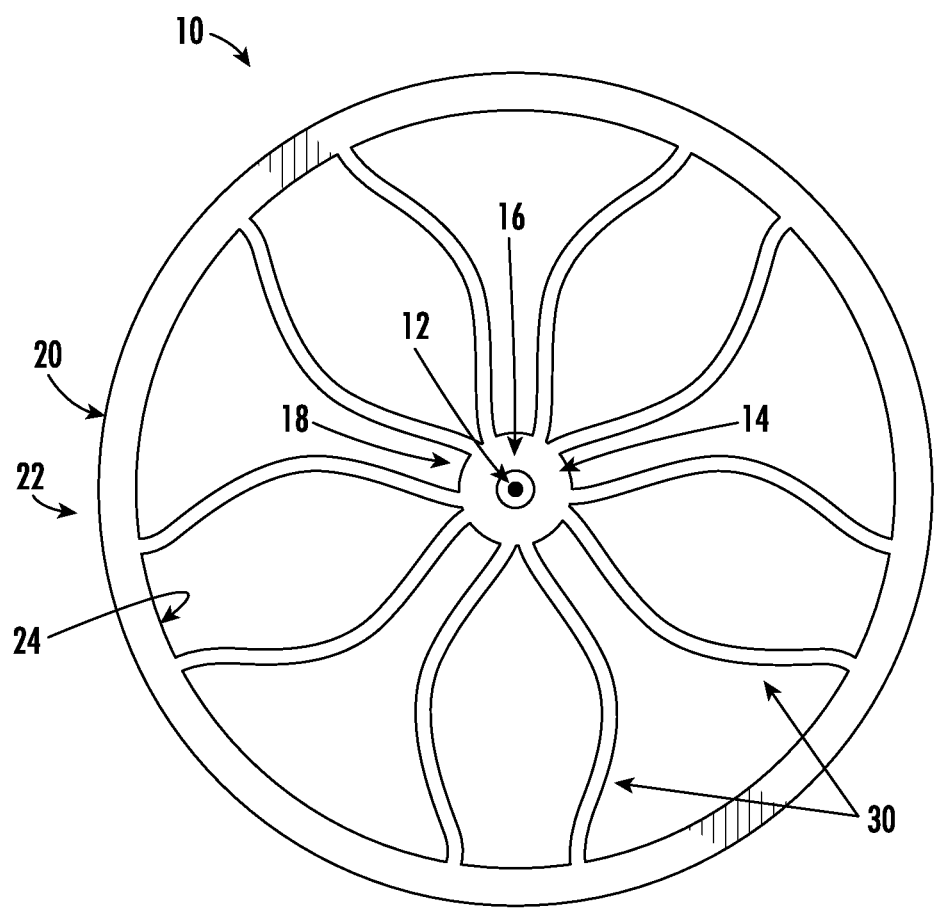
FIG. 1 is a side view of a wheel, according to an exemplary embodiment.

Referring to FIG. 1, various aspects of a wheel, shown as compliant wheel 10, are shown. In specific embodiments, wheel 10 is utilized in combination with an airless tire. In specific embodiments, wheel 10 is a deformable wheel. Wheel 10 is utilized to facilitate transporting other objects, such as a modular storage system shown in International Patent Application No. PCT/US2018/044629, which is incorporated herein by reference in its entirety. In another specific embodiment, a storage device that utilizes a wheel 10 described herein has coupling interfaces on both the top and bottom that permit the storage device to couple to a modular storage unit via an interface compatible with the coupling mechanism(s) described in International Patent Application No. PCT/US2018/044629, which is incorporated herein by reference in its entirety.

As shown in FIG. 1, wheel 10 includes a hub, shown as central hub 14, that defines a channel 16, and a rim, shown as outer rim 20, located further from the rotational axis 12 than central hub 14. When assembled, an axle is inserted into channel 16, permitting wheel 10 to rotate around rotational axis 12 with respect to the axle. When wheel 10 is rotated around rotational axis 12, central hub 14 and outer rim 20 also rotate about rotational axis 12.

Spokes 30 extend from central hub 14 to outer rim 20. In a specific embodiment, spokes 30 are rigidly coupled to outer surface 18 of central hub 14 and to inner surface 24 of outer rim 20. As wheel 10 is utilized and absorbs forces spokes 30 are deformed. Spokes 30 thus provide both the function of facilitating movement via rotating around axis 12 and providing a force-absorbing functionality similar to a shock absorber. It is considered that spokes 30 may deform for forces that are transitory, such as when wheel 10 goes over an uneven surface, or permanent forces, such as when wheel 10 is supporting a weight for a period of time. In specific embodiments, because the deformation of the spokes remains within the elastic range of the spokes, the spokes return to their original position/shape once the load is removed.

In a specific embodiment, central hub 14, spokes 30 and outer rim 20 are made of the same first material. In a specific embodiment, the first material may have a modulus of elasticity in a given range between 1500 and 2500 MPa. In some embodiments, a second material (e.g., rubber) may be adhered to outer surface 22 of outer rim 20, thus providing an improved grip for wheel 10 against other surfaces (e.g., the ground).

Figure 2:
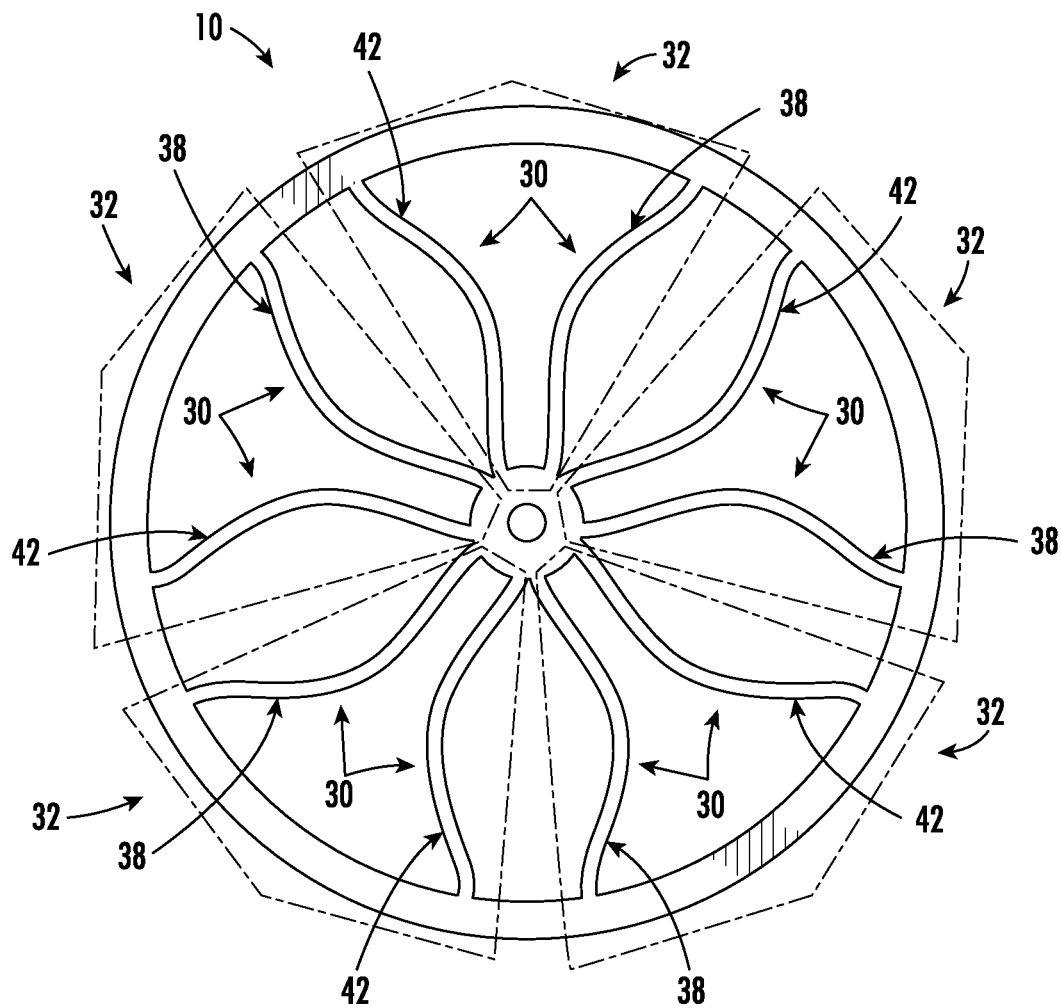
FIG. 2 is a side view of the wheel of FIG. 1.
Figure 3:
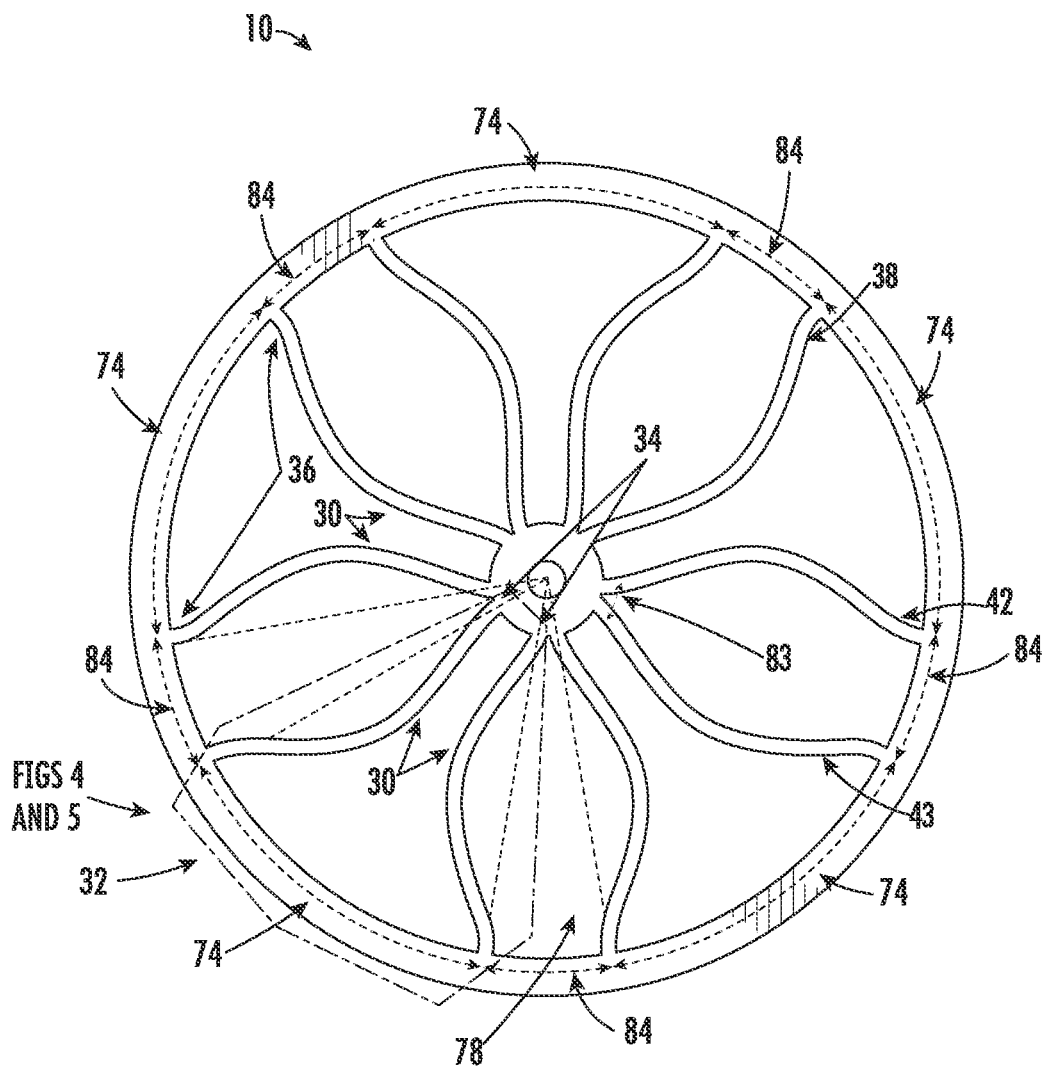
FIG. 3 is a side view of the wheel of FIG. 1.

Turning to FIGS. 2 and 3, spokes 30 are arranged in a plurality of spoke sets 32. In the embodiment shown in FIG. 2, there are five sets 32 of spokes 30, with each set 32 including two spokes 30. Spokes 30 within a set 32 are symmetrical with respect to a radius extending from axis 12. In a specific embodiment, each set 32 includes a first spoke 38 and a second spoke 42. In a specific embodiment, each of the first spokes 38 are located circumferentially between two second spokes 42. In a specific embodiment, each of the second spokes 42 are located circumferentially between two first spokes 38. In a specific embodiment, each set of spokes includes three spokes 30, including first spoke 38, second spoke 42, and third spoke 43. As will be described in more detail below, when wheel 10 absorbs a force, one or more of spokes 30 within a particular set 32 deform towards the other spoke 30. When sufficient force is applied to wheel 10, one or more of spokes 30 within a set 32 deforms towards and ultimately interfaces against the other spoke 30 within the respective set 32. As will be discussed in more detail below, once spokes 30 within a set 32 interface with each other, further deformation requires additional load, and thus in this manner, wheel 10 is designed to have a rigidity that increases as the load on the wheel increases.

Figure 4:
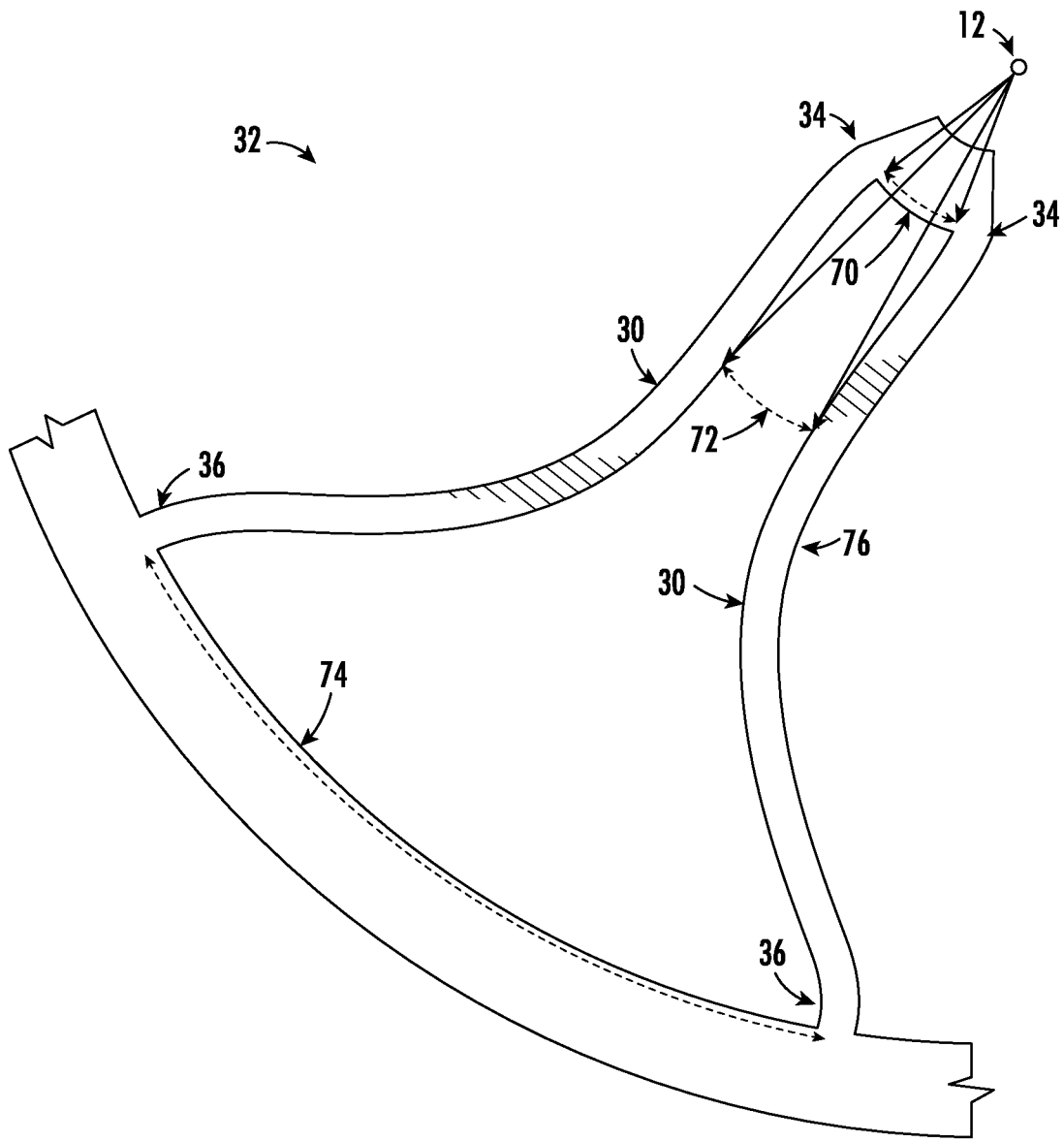
FIG. 4 is a detailed side view of the wheel of FIG. 1.

Turning to FIGS. 3 and 4, outer ends 36 of spokes 30 are each coupled to outer rim 20, and inner ends 34 of spokes 30 are each coupled to central hub 14. Spokes 30 within a particular set 32 define a distance 74, measured in radians with respect to axis 12, between the outer ends 36 of adjacent spokes 30, and a distance 84, measured in radians with respect to axis 12, between outer ends 36 of the spokes 30 of adjacent sets 32 with respect to axis 12. In a specific embodiment, distance 84 is measured between outer section 36 of second spoke 42 and outer section 36 of third spoke 43 when the wheel is not deformed. A distance 83 is measured between inner section 34 of second spoke 42 and inner section 34 of third spoke 43. As shown in FIG. 3, distance 83 is less than distance 84. Turning to FIG. 4 in particular, within a particular set 32 of spokes 30, spokes 30 define distance 74, measured in radians with respect to axis 12, at outer end 36, spokes 30 define distance 70, measured in radians with respect to axis 12, at inner end 34, and spokes 30 define distance 72, measured in radians with respect to axis 12 at a middle of spokes 30. In a specific embodiment, distance 72 is defined as the smallest distance between spokes 30 with respect to axis 12. In a specific embodiment, the smallest distance between first spoke 38 and second spoke 42 as measured in radians with respect to the rotational axis 12 is between middle section 52 of first spoke 38 and middle section 52 of the second spoke 42 when the wheel 10 is not deformed. In a specific embodiment, distance 83 is less than distance 70.

Spokes 30 extend a radial distance 78 from inner end 34 to outer end 36. Because of the curvature of spokes 30, spokes 30 have an actual length 76 that is greater than radial distance 78.

Figure 5:
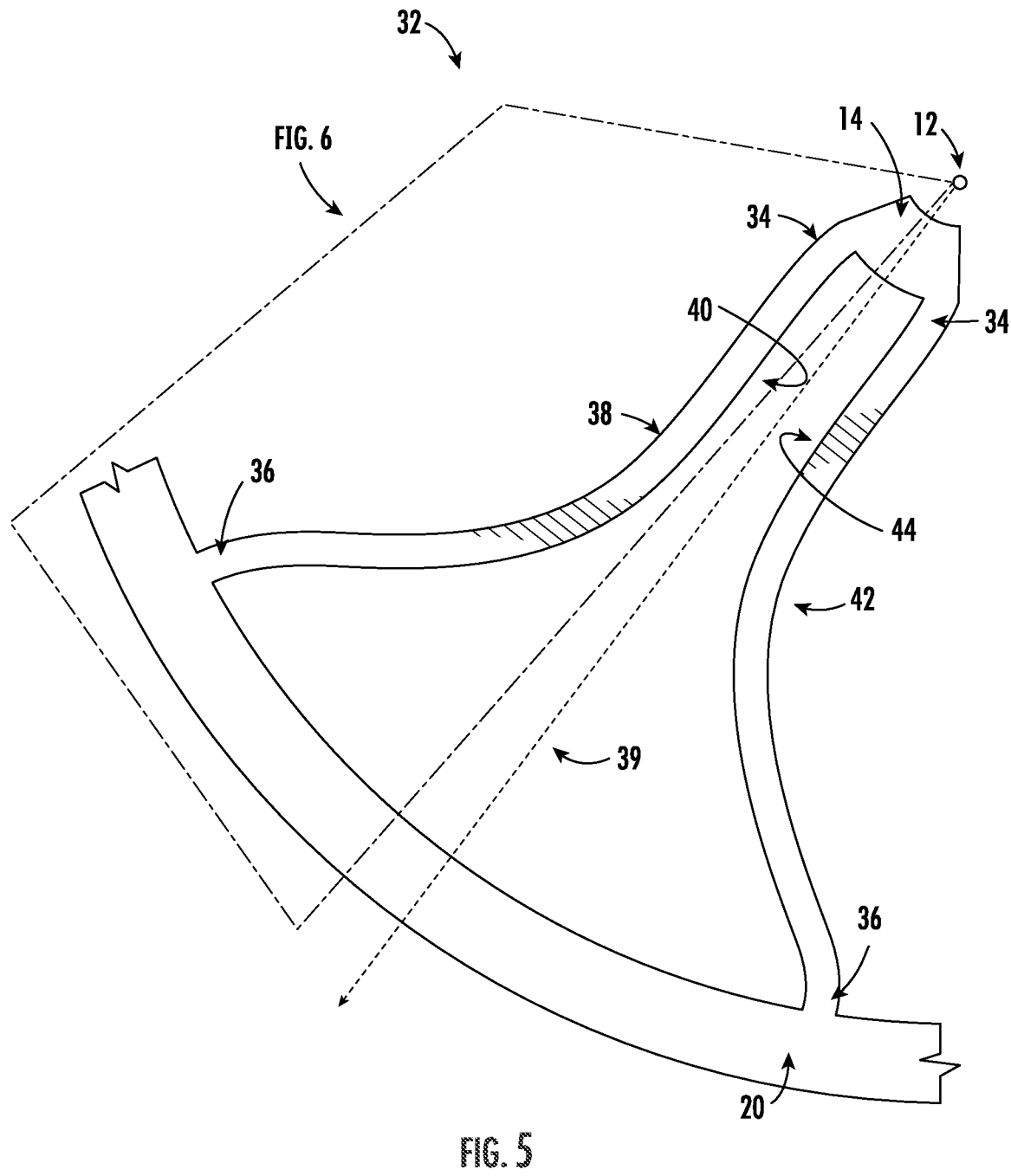
FIG. 5 is a detailed side view of the wheel of FIG. 1.

Turning to FIG. 5, a particular set 32 of spokes 30 includes first spoke 38 and opposing second spoke 42. In a specific embodiment, each set 32 includes a first spoke 38 and opposing second spoke 42. In a specific embodiment, wheel 10 includes a plurality of first spokes 38 extending from central hub 14 to outer rim 20 and a plurality of second spokes 42 extending from central hub 14 to outer rim 20. In the embodiment shown in FIG. 5, first spoke 38 and second spoke 42 are shaped to be mirror images of each other (e.g., symmetric) about a radius 39 equidistant between both spokes 38, 42. As will be described in more detail below, when wheel 10 absorbs enough force then one of first spoke 38 and second spoke 42 is deformed towards the other spoke. When first spoke 38 and/or second spoke 42 is sufficiently deformed, inner surface 40 of first spoke 38 interfaces against inner surface 44 of second spoke 42, thus such that spokes support each other so that an even greater amount of force is required to further deform spoke.

Figure 6:
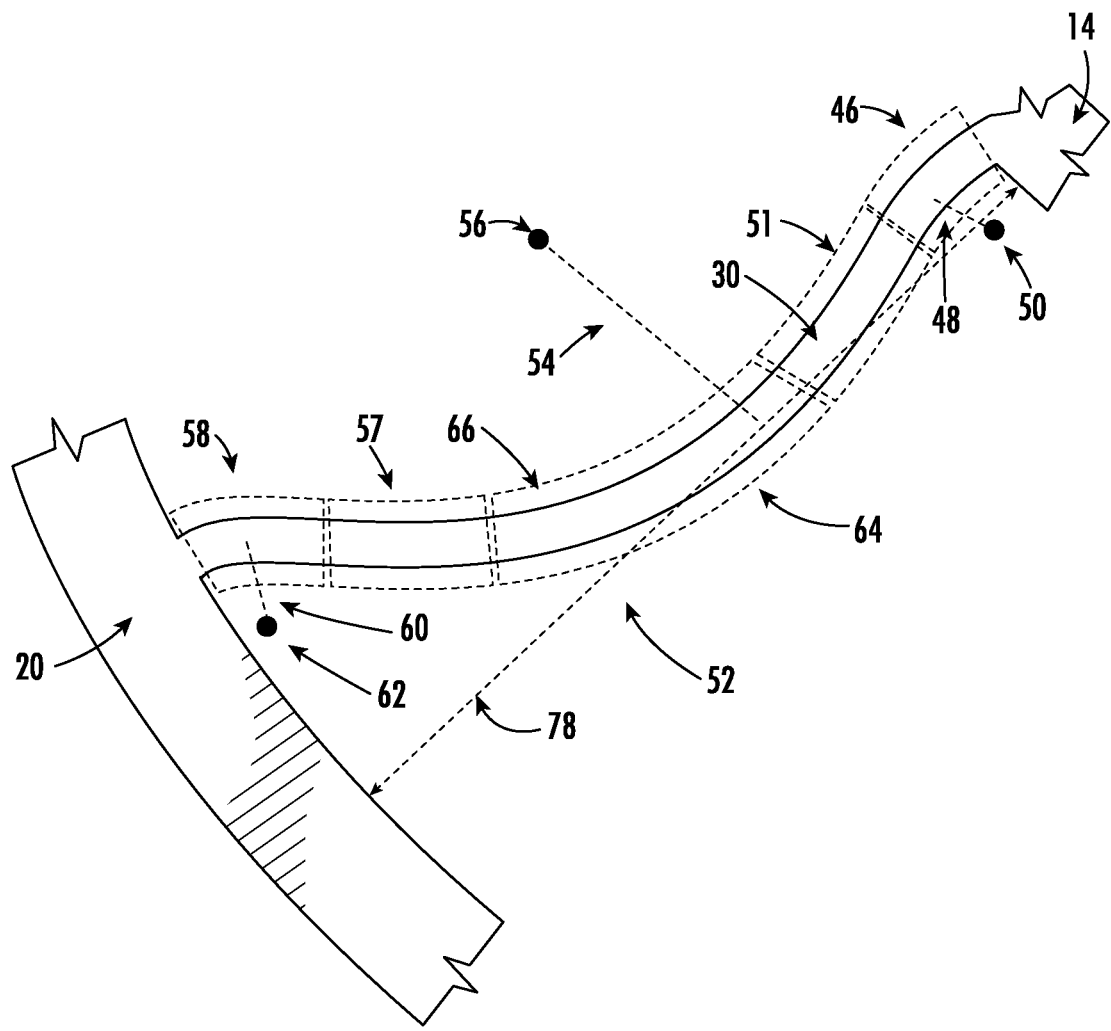
FIG. 6 is a detailed side view of the wheel of FIG. 1.

Turning to FIG. 6, in a specific embodiment, spokes 30 include a series of curves and inflection points. In a specific embodiment, each spoke 30 includes an inner section 46 extending from the central hub 14, an outer section 58 extending from the outer rim 20, and a central section 52 extending between inner section 46 and outer section 58.

In a specific embodiment, central hub 14 and outer rim 20 are separated by radial distance 78. In a specific embodiment, inner section 46 extends from central hub 14 and has a length between 5% and 50% of radial distance 78 or actual length 76, and more specifically between 5% and 25%, and more specifically between 10% and 15%. In a specific embodiment, middle section 52 extends between 25% and 80% of radial distance 78 or actual length 76, and more specifically between 30% and 70%, and more specifically between 35% and 55%. In a specific embodiment, outer section 58 extends from outer rim 20 and has a length between 5% and 25% of radial distance 78 or actual length 76.

Inner section 46 of spoke 30 is radius 48 from center 50, middle section 52 is radius 54 from center 56, and outer section 58 is radius 60 from center 62. Center 50 and center 62 are on first side 64 of spoke 30, and center 56 is on second side 66 of spoke 30. Inner inflection section 51 is the transition from inner section 46 to middle section 52, and outer inflection section 57 is the transition from middle section 52 to outer section 58. In a specific embodiment, middle section 52 of first spoke 38 and the middle section 52 of second spoke 42 are convex with respect to each other when wheel 10 is not deformed. In a specific embodiment, inner section 46 of first spoke 38 and the inner section 46 of second spoke 42 are concave with respect to each other when wheel 10 is not deformed. In a specific embodiment, outer section 58 of first spoke 38 and the outer section 58 of second spoke 42 are concave with respect to each other when wheel 10 is not deformed.

Figure 7:
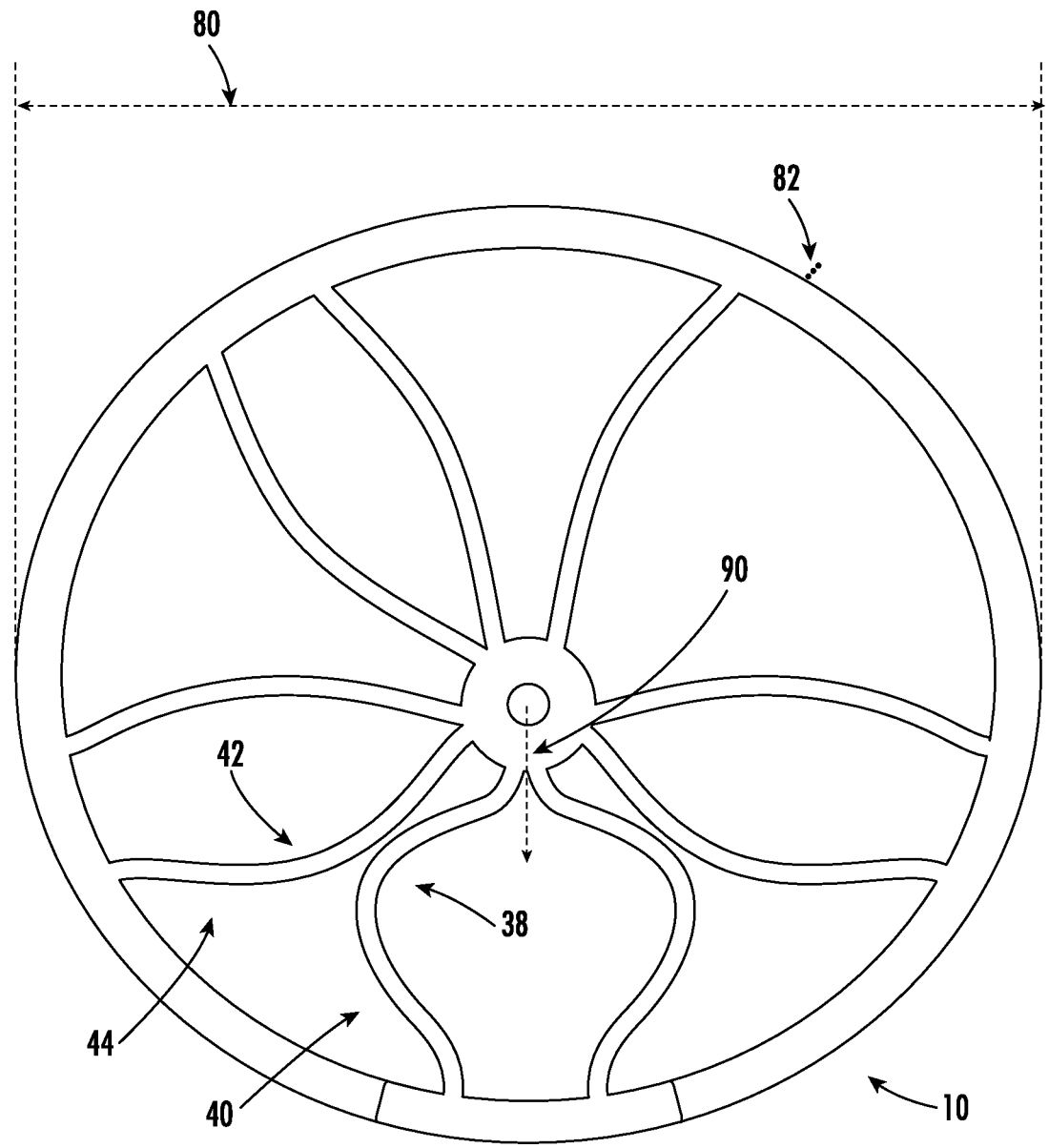
FIG. 7 is a perspective view of the wheel of FIG. 1 when deformed by an exemplary force.

Turning to FIG. 7, shown are various aspects of wheel 10 when deformed by force 90, according to an exemplary embodiment. As shown, inner surface 40 of first spoke 38 deforms towards inner surface 44 of second spoke 42. During loading of the wheel 10 sufficient to cause deformation of wheel 10, one of the first spokes 38 engages against one of the second spokes 42 when the wheel 10 is deformed a first amount such that the engagement resists further deformation of the wheel 10. When first spoke 38 is sufficiently deformed and first spoke 38 interfaces against second spoke 42, first spoke 38 is structurally supported by second spoke 42 such that the first spoke 38 and the second spoke 42 bias each other from being deformed further when first spoke 38 and second spoke 42 are interfacing against each other. As a result, the interface between first spoke 38 and second spoke 42 biases wheel 10 from further deformation because further deformation of first spoke 38 requires that second spoke 42 also be deformed, and thus occurs when force 90 is substantially increased. When force 90 is removed spokes 30 return to their original shape.

Stated another way, to be further deformed, before first spoke 38 is interfacing against second spoke 42 then first spoke 38 requires a first amount of additional force to force 90 of X to deform further. After first spoke 38 is interfacing against second spoke 42, first spoke requires a second amount of additional force to force 90 of Y to deform further, wherein Y is greater than X because both first spoke 38 and second spoke 42 are being deformed.

In a specific embodiment, wheel 10 has diameter 80 of 9 inches and width 82 of 2.5 inches. In a specific embodiment, wheel 10 includes a different number of sets 32 of spokes 30, such as seven sets 32 of spokes 30 or eight sets 32 of spokes 30.

Figure 8:
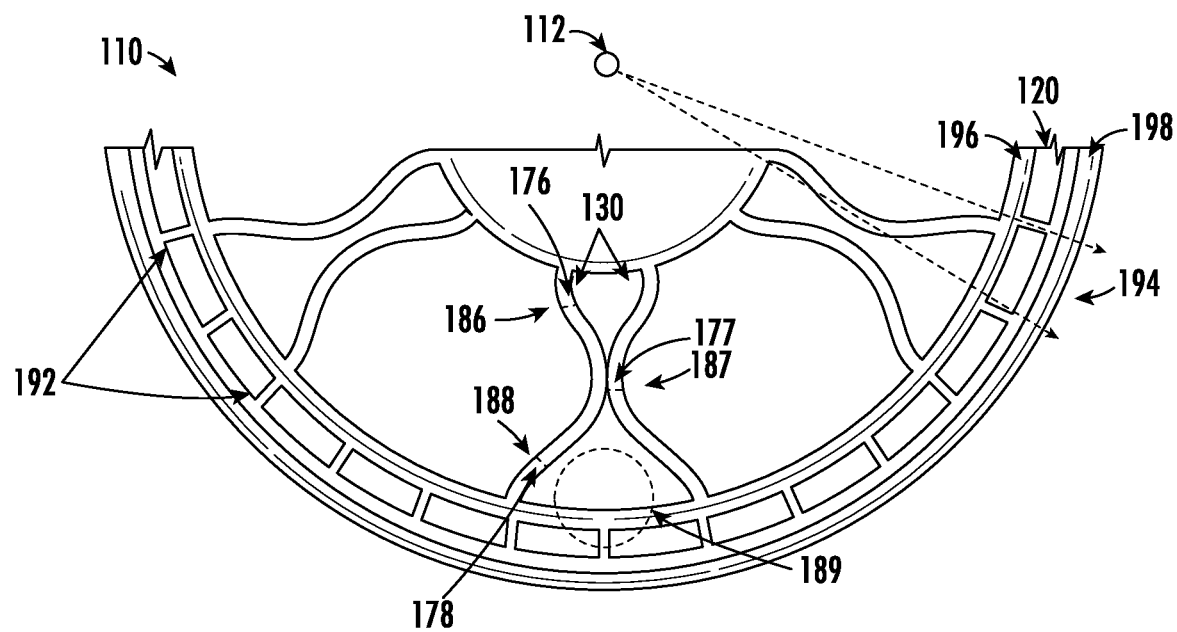
FIG. 8 is a partial side view of a wheel, according to an exemplary embodiment.
Figure 9:
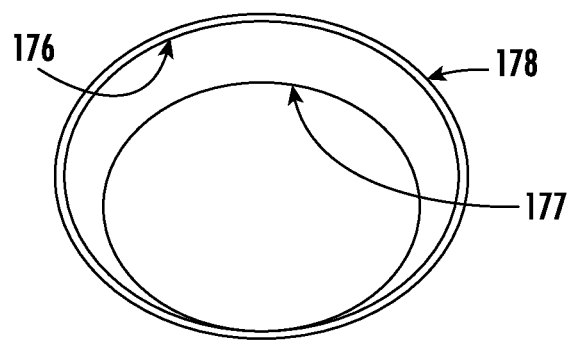
FIG. 9 is a view of cross-sections of the spokes of the wheel of FIG. 8 overlaid on top of each other, according to an exemplary embodiment.

Referring to FIGS. 8-9, various aspects of a wheel, shown as compliant wheel 110, are shown according to an exemplary embodiment. Wheel 110 is similar to wheel 10 except for the differences described herein. Wheel 110 includes a plurality of ribs 192 that extend between inner wall 196 of outer portion 120 and outer wall 198 of outer portion 120. In a specific embodiment, ribs 192 extend radially with respect to rotational axis 112 of wheel 110, and are spaced angle 194 apart from each other with respect to axis 112. In a specific embodiment, ribs 192 are positioned symmetrically with respect to each other around wheel 110 with respect to axis 112.

Spokes 130 have a thickness (e.g., area of the cross-section) that varies along their length in the radial direction with respect to the rotational axis. In a specific embodiment, spokes 130 are thinner (e.g., a smaller cross-section area 177) at central portion 187 as compared to cross-sectional area 176 of inner portion 186, which is closer to axis 112 than central portion 187. Spokes 130 are also thinner (e.g., a smaller cross-section area 177) at central portion 187 as compared to cross-sectional area 178 of outer portion 188, which is further from axis 112 than central portion 187. FIG. 9 depicts a comparison of the sizes of cross-section area 176, 177, and 178 overlaid on top of each other according to an exemplary embodiment.

This varying thickness (e.g., cross-section) of spokes 130 causes spokes 130 to primarily bend at central portion 187 when wheel 110 is deformed. As a result, when spokes 130 deform the central portions 187 of neighboring spokes 130 interface with each other before inner portions 186 or outer portions 188 interface with each other.

In a specific embodiment, a support structure (e.g., such as ribs 192 extending inwardly from inner wall 196) can be added in area 189 to support spokes 130.

The stiffness of wheel 110 depends on several factors, including for example the modulus of elasticity of the material that the wheel 110 and/or spokes 130 are formed from, the geometry of the wheel 110 (e.g., the length, the thickness, and/or the number of ribs 192), and the spacing of spokes 130. For example, additional ribs 192 can be added to wheel 110 to increase an amount of force necessary to deform wheel 110.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A deformable wheel comprising:
a rotational axis the wheel rotates around;
a hub that rotates around the rotational axis;
a rim that rotates around the rotational axis, the rim located further from the rotational axis than the hub;
a plurality of spokes extending between the hub and the rim, each spoke comprising an inner section extending from the hub, an outer section extending from the rim, and a middle section extending between the inner section and the outer section; and
at least one set of spokes comprising:
a first spoke of the plurality of spokes;
a second spoke of the plurality of spokes; and
a third spoke of the plurality of spokes;
a first distance extending between a first portion of the inner section of the first spoke coupled to the hub and a second portion of the inner section of the second spoke coupled to the hub when the wheel is not deformed;
a second distance extending between a third portion of the outer section of the first spoke coupled to the rim and a fourth portion of the outer section of the second spoke coupled to the rim when the wheel is not deformed;
a third distance extending between the second portion of the inner section of the second spoke and a fifth portion of the inner section of the third spoke when the wheel is not deformed; and
a fourth distance extending between the fourth portion of the outer section of the second spoke and a sixth portion of the outer section of the third spoke when the wheel is not deformed;
wherein the first distance is less than the second distance;
wherein the third distance is less than the fourth distance;
wherein the third distance is less than the first distance;
wherein the inner section of the first spoke and the inner section of the second spoke are concave with respect to each other when the wheel is not deformed; and
wherein during loading of the wheel sufficient to cause deformation of the wheel, the first spoke of the at least one set of spokes engages against the second spoke in the at least one set of spokes when the wheel is deformed a first amount such that the engagement resists further deformation of the wheel.

2. The deformable wheel of claim 1, wherein the first spoke and the second spoke bias each other from being deformed further when the first spoke and second spoke interface against each other.

3. The deformable wheel of claim 2, wherein the interface between the first spoke and the second spoke biases the wheel to resist further deformation.

4. The deformable wheel of claim 1, wherein the wheel absorbs a first amount of force when the first spoke and the second spoke do not interface with each other and the wheel is being deformed, and wherein the wheel absorbs a second amount of force greater than the first amount of force when wheel is being deformed and the first spoke and the second spoke do not interface with each other.

5. The deformable wheel of claim 1, wherein the second spoke is positioned between the first spoke and the third spoke.

6. The deformable wheel of claim 1, wherein the first spoke comprises a thickness that varies along a length of the first spoke in a radial direction with respect to the rotational axis.

7. A wheel comprising:
a rotational axis the wheel rotates around;
a hub that rotates around the rotational axis;
a rim that rotates around the rotational axis, the rim located further from the rotational axis than the hub;
a first spoke extending between the hub and the rim, the first spoke comprising an inner section extending from the hub with a first portion of the inner section coupled to the hub, an outer section extending from the rim with a third portion of the outer section coupled to the rim, and a middle section extending between the inner section and the outer section;
a second spoke extending between the hub and the rim, the second spoke comprising an inner section extending from the hub with a second portion of the inner section coupled to the hub, an outer section extending from the rim with a fourth portion of the outer section coupled to the rim, and a middle section extending between the inner section and the outer section;
a third spoke extending between the hub and the rim, the third spoke comprising an inner section extending from the hub with a fifth portion of the inner section coupled to the hub, an outer section extending from the rim with a sixth portion of the outer section coupled to the rim, and a middle section extending between the inner section and the outer section;
wherein the second spoke is positioned between the first spoke and the third spoke;
a first distance defined between the first portion of the first spoke and the second portion of the second spoke when the wheel is not deformed;
a second distance defined between the third portion of the first spoke and the fourth portion of the second spoke when the wheel is not deformed;
a third distance defined between the second portion of the second spoke and the fifth portion of the third spoke when the wheel is not deformed; and
a fourth distance defined between the fourth portion of the second spoke and the sixth portion of the third spoke when the wheel is not deformed;
wherein the first distance is less than the second distance, and the third distance is less than the fourth distance;
wherein the third distance is less than the first distance;
wherein the inner section of the first spoke and the inner section of the second spoke are concave with respect to each other when the wheel is not deformed; and
wherein during loading of the wheel sufficient to cause deformation of the wheel, the first spoke engages the second spoke when the wheel is deformed a first amount such that the engagement resists further deformation of the wheel.

8. The wheel of claim 7, wherein the middle section of the first spoke extends between 25% and 80% of a length of the first spoke from the hub to the rim.

9. The wheel of claim 7, wherein the middle section of the first spoke and the middle section of the second spoke are convex with respect to each other when the wheel is not deformed.

10. The wheel of claim 9, wherein the outer section of the first spoke and the outer section of the second spoke are concave with respect to each other.

11. The wheel of claim 7, wherein the first spoke comprises a thickness that varies along a length of the first spoke in a radial direction with respect to the rotational axis.

12. The wheel of claim 11, wherein the thickness of the middle section of the first spoke is less than the thickness of the inner section of the first spoke, and the thickness of the middle section of the first spoke is less than the thickness of the outer section of the first spoke.

13. The wheel of claim 11, wherein the second spoke comprises a second thickness that varies along a second length of the second spoke in a radial direction with respect to the rotational axis.

14. A wheel comprising:
a rotational axis the wheel rotates around;
a hub that rotates around the rotational axis;
a rim that rotates around the rotational axis, the rim located further from the rotational axis than the hub;
a first spoke extending between the hub and the rim, the first spoke comprising an inner section extending from the hub, an outer section extending from the rim, and a middle section extending between the inner section and the outer section;
a second spoke between the hub and the rim, the second spoke comprising an inner section extending from the hub, an outer section extending from the rim, and a middle section extending between the inner section and the outer section; and
a third spoke between the hub and the rim, the third spoke comprising an inner section extending from the hub, an outer section extending from the rim, and a middle section extending between the inner section and the outer section;
wherein the second spoke is positioned between the first spoke and the third spoke;
wherein the smallest distance between the first spoke and the second spoke as measured in radians with respect to the rotational axis is between the middle section of the first spoke and the middle section of the second spoke when the wheel is not deformed;
wherein the smallest distance between the second spoke and the third spoke as measured in radians with respect to the rotational axis is between the inner section of the second spoke and the inner section of the third spoke;
wherein the distance between the inner section of the second spoke and the inner section of the third spoke is less than a distance between the outer section of the second spoke and the outer section of the third spoke;
wherein the distance between the inner section of the second spoke and the inner section of the third spoke is less than a distance between the inner section of the first spoke and the inner section of the second spoke;
wherein the inner section of the first spoke and the inner section of the second spoke are concave with respect to each other when the wheel is not deformed; and
wherein during loading of the wheel sufficient to cause deformation of the wheel, the first spoke engages the second spoke when the wheel is deformed a first amount such that the engagement resists further deformation of the wheel.

15. The wheel of claim 14, wherein the first spoke comprises a first thickness that varies along a first length of the first spoke in a radial direction with respect to the rotational axis, and wherein the second spoke comprises a second thickness that varies along a second length of the second spoke in a radial direction with respect to the rotational axis.

16. The wheel of claim 15, wherein the inner section of the first spoke extends between 5% and 50% of a length of the first spoke from the hub to the rim.

17. The wheel of claim 16, wherein the middle section of the first spoke extends between 25% and 80% of a length of the first spoke from the hub to the rim.

* * * * *